United States Patent
Serbin, Sr.

(10) Patent No.: US 11,919,755 B1
(45) Date of Patent: Mar. 5, 2024

(54) PORTABLE WINCH SYSTEM

(71) Applicant: James Serbin, Sr., Bernalillo, NM (US)

(72) Inventor: James Serbin, Sr., Bernalillo, NM (US)

(*) Notice: Subject to any disclaimer, the term of this patent is extended or adjusted under 35 U.S.C. 154(b) by 0 days.

(21) Appl. No.: 18/295,563

(22) Filed: Apr. 4, 2023

(51) Int. Cl.
| | |
|---|---|
| *B60D 3/00* | (2006.01) |
| *B66D 3/00* | (2006.01) |
| *B66D 3/26* | (2006.01) |
| *H02J 7/35* | (2006.01) |
| *B66D 3/20* | (2006.01) |

(52) U.S. Cl.
CPC ............. *B66D 3/26* (2013.01); *B66D 3/006* (2013.01); *H02J 7/35* (2013.01); *B66D 3/20* (2013.01); *B66D 2700/0141* (2013.01); *B66D 2700/0183* (2013.01)

(58) Field of Classification Search
CPC . B66D 3/25; B66D 3/006; B66D 3/20; B66D 2700/0141; B66D 2700/0183; B66D 3/00; H02J 7/35
See application file for complete search history.

(56) References Cited

U.S. PATENT DOCUMENTS

| | | | |
|---|---|---|---|
| 6,386,514 B1 | 5/2002 | Ray | |
| 7,543,798 B2 | 6/2009 | Cunningham | |
| 7,913,978 B1 * | 3/2011 | Trihey | B66D 3/006 254/323 |
| D933,329 S | 10/2021 | Lanini et al. | |
| 2013/0234645 A1 * | 9/2013 | Goei | H02S 20/32 320/101 |
| 2015/0329335 A1 * | 11/2015 | Azzarelli | B66D 3/006 254/323 |

FOREIGN PATENT DOCUMENTS

CN 112112131 A 12/2020

OTHER PUBLICATIONS

Anbull Drill Winch/Hoist Portable Drill Winch of 750 LB Capacity with 40 Feet Steel Wire Drill Winch for Lifting & Dragging, https://www.amazon.com/Anbull-Portable-Capacity-Lifting-Dragging/dp/B097QXG74D/ref=sr_1_1_sspa?keywords=portable+winch&qid=1669840460&sr=8-1-spons&psc=1&spLa=ZW5jcnlwdGVkUXVhbGlmaWVyPUExMzBXNVo0TU1PRUFQJmVuY3J5cHRlZElkPUEwNzMwMjE3WklaQkYwM1cwMTNIJmVuY3J5cHRlZEFkSWQ9QTA4OTY1ODUxV0VVRVMzI4U0czTIVVJndpZGdldE5hbWU9c3BfYXRmJmFjdGlvbj1jbGlja1JlZGlyZWN0JmRvTm90TG9nQ2xpY2s9dHJ1ZQ==, 2022 (8 pages).

DK2 Spartan 6000 lb. Electric Planetary Gear Winch with Steel Cable, 17.44×7.7×10.8 in., https://www.tractorsupply.com/tsc/product/dk2-spartan-6000-lb-electric-planetary-gear-winch-with-steel-cable-6000; 2022 (3 pages).

(Continued)

*Primary Examiner* — Robert L Deberadinis
(74) *Attorney, Agent, or Firm* — Wilmer Cutler Pickering Hale and Dorr LLP

(57) ABSTRACT

The invention is directed to portable winch systems comprising a winch that is powered by a rechargeable first power source operably connected to the winch and a second power source operably connected to the rechargeable first power source and/or the winch. In certain embodiments, the system comprises a frame and/or housing to which one or more of the winch system components is mounted. In some embodiments, the portable winch system comprises a mechanism to mount the system to a hitch receiver of a vehicle or other object and/or mechanisms for transporting the system, such as casters and/or handles.

19 Claims, 7 Drawing Sheets

(56) References Cited

OTHER PUBLICATIONS

Keeper, 7,500 lbs. Portable Winch 12VDC with Rapid Mount, https://www.homedepot.com/p/Keeper-7-500-lbs-Portable-Winch-12VDC-with-Rapid-Mount-KW75122RM-1/202862238, 2022 (4 pages).
Landworks Electric Portable Winch Hoist Crane Lift Brushless Motor Li-Ion Battery Powered 1000Lbs/455Kgs Max Weight 20' Feet/6m Steel Braided Cable w/Locking Knob for atv truck boat trailer etc., https://www.walmart.com/ip/Landworks-Electric-Portable-Winch-Hoist-Crane-Lift-Brushless-Motor-Li-Ion-Battery-Powered-1000Lbs-455Kgs-Max-Weight-20-Feet-6m-Steel-Braided-Cable-w-/894659079, 2022 (4 pages).
PCW3000-Li, Battery-Powered Pulling Winch 80/82 V, Product Sheet, Portable Winch Co., www.portablewinch.info, 2022 (1 page).
Q&A: Solar Charging for my 12 Volt Winch Battery, Eco solar Charging System, https://www.etrailer.com/question-425620.html, 2022 (5 pages).
Reese Towpower Portable Electric Winch, https://www.amazon.com/dp/B01MDKPV0J?tag=dobosiconsult-20&linkCode=ogi&th=1&psc=1, 2022 (6 pages).
Solar Charging Battery Case for Winch, Lakeside Recreation, https://shoreramp.com/products/solar-charging-battery-case-for-winch, 2022 (5 pages).
Ty Fenwick, "Trailer Winch Powered by the Sun! 12v equipment/car trailer winch set up". YouTube, https://youtu.be/aGqdvk_luVM, uploaded Jul. 28, 2018 (13 pages).
VIAGL Universal Trailer Hitch Winch Mountain Plate with 2" Receiver, Winch Bracket Winch Mounting Plate for ATV UTV Winch Bracket Mounting Bracket, https://www.amazon.com/VIAGL-Universal-Trailer-Mounting-Receiver/dp/B0B7Q68DZG/ref=sr_1_1_sspa?keywords=Hitch+Mounted+Winch&qid=1669906409&sr=8-1-spons&psc=1&spLa=ZW5jcnlwdGVkUXVhbGlmaWVyPUFBTERFVFZVR1o2TzcmZW5jcnlwdGVkSWQ9QTA1NjY2NDczRUcxRU5GUVZYTjFGJmVuY3J5cHRlZEFkSWQ9QTA5ODU3MzUxWU9DN05VOTBSOUdlJndpZGdldE5hbWU9c3BfYXRmJmFjdGlvbj1jbGlja1JlZGlyZWN0JmRvTm90TG9nQ2xpY2s9dHJ1ZQ==, 2022 (6 pages).
Warn XD9I Multi-Mount Winch—104183, https://www.warn.com/xd9i-multi-mount-winch-104183, 2022 (5 pages).
Warn, Pullzall Cordless 1000 Lb Portable Winch 885005 (2 Batteries), https://www.warn.com/pullzall-cordless-winch-2-batteries-885005, 2022 (6 pages).

\* cited by examiner

PORTABLE WINCH SYSTEM

BACKGROUND OF THE INVENTION

The present invention relates to portable winch systems that can be reversibly affixed or mounted to a vehicle or other stationary object, that have a self-sustaining energy source, and can be used for pulling, hauling, towing, lifting, and other known uses for common mounted winches.

Winches are tools or devices commonly used to pull, haul, tow, or lift heavy objects, such as vehicles, trailers, debris, and other heavy objects. A winch generally comprises a rotating drum or reel, a rope, cable, or chain wound around the drum or reel, and a motor operably attached to the drum or reel for extending and retracting the rope, cable, or chain.

There are multiple ways to use a winch. For example, users can attach a winch to a heavy object that needs to be pulled, such as a vehicle or trailer, and wrap the winch's rope, cable, or chain around a nearby structure, such as a tree or large rock, for leverage to pull the heavy object. As another example, users can attach a winch to an object, such as a vehicle or trailer, and use the rope, cable, or chain to pull debris or other vehicles. Winches can be essential for drivers whose vehicles are stuck, such as being stuck in a ditch, mud, snow, being high-centered or otherwise stuck, including in emergency situations.

Most vehicles do not come with a winch attached to the vehicle. Instead, users must purchase winches from third parties. It is often necessary for users to install (e.g. permanently affix) these winches on their vehicles because of the heft and bulk of the winch, which can make them difficult to transport and continuously detach and reattach to the vehicle. Therefore, users are often limited to having these heavy and bulky winches permanently installed on their vehicle.

Permanently installing a winch on a vehicle may also be necessary for electric winch systems, many of which do not have a self-sustaining energy source and must rely on the limited capacity of an external energy source, such as the vehicle's battery. Users relying on their vehicle's battery to power an electric winch are often limited to permanently installing the electric winch to their vehicle to ensure they have sufficient energy to operate the winch.

Additionally, although electric winches that do not rely on an external energy source have been disclosed, they are lacking in several aspects. These winch systems are limited by the power and life of the internal energy source. They may also not conveniently and temporarily attach to the vehicle or other large object and may require a separate mounting device.

Further, many non-electric winches that are currently sold are not easy to operate. Some of these winches require users to use a hand crank. This can be inaccessible for users who do no not have the energy or ability to operate a hand crank. These hand-cracked winches are also often limited in their power and ability to move heavy objects in contrast to electric-powered winches. Some non-electric winches currently available also require users to have additional tools, such as a drill, to operate them. These additional tools may not be at the user's disposal when they find themselves needing to use a winch.

Consequently, there is a need for a portable winch system that is easy to transport, is reversibly attachable to a variety of stationary objects, including vehicles, trailers, and other objects, contains a self-sustaining energy source, and does not require extra tools to operate.

SUMMARY OF THE INVENTION

Portable winch systems with a self-sustaining energy source are provided. The following embodiments recite non-limiting permutations of combinations of features of the inventions described. Other permutations of combinations of features are also contemplated and/or described throughout the disclosure. In particular, each of these numbered embodiments is contemplated as depending from or relating to every previous or subsequent numbered embodiment, independent of the listed order. E1. A portable winch system, comprising a frame; a winch; a rechargeable first power source operably connected to the winch; and a second power source operably connected to the rechargeable first power source, the winch, or both the rechargeable first power source and the winch; wherein one or more of the winch, the rechargeable first power source, and the second power source is mounted to the frame, and wherein the second power source is capable of at least partially charging the rechargeable first power source. E2. The portable winch system of embodiment E1, wherein one or more of the winch, the rechargeable first power source, and the second power source is reversibly mounted to the frame. E3. The portable winch system of embodiment E1 or embodiment E2, further comprising a housing. E4. The portable winch system of embodiment E3, wherein the housing substantially encloses one or more of the winch, the rechargeable first power source, and the second power source. E5. The portable winch system of embodiment E3 or embodiment E4, wherein one or more of the winch, the rechargeable first power source, and the second power source is mounted to the housing. E6. The portable winch system of any one of embodiments E3-E5, wherein one or more of the winch, the rechargeable first power source, and the second power source is reversibly mounted to the housing. 7. The portable winch system of any one of embodiments E1-E6, wherein the frame comprises metal, plastic, wood, or a combination thereof. E8. The portable winch system of any one of embodiments E3-E6, wherein the housing comprises metal, plastic, wood, or a combination thereof. E9. The portable winch system of any one of embodiments E1-E8, wherein the winch comprises a rope, cable, or chain. E10. The portable winch system of any one of embodiments E1-E9, wherein the rechargeable first power source comprises a battery. E11. The portable winch system of embodiment E10, wherein the battery is a 12-volt battery, a lithium-ion battery, a lead acid battery, and/or an AGM battery. E12. The portable winch system of any one of embodiments E1-E11, wherein the second power source comprises a solar power source. E13. The portable winch system of embodiment E12, wherein the solar power source is capable of dispensing up to about 48 volts of power. E14. The portable winch system of embodiment E13, wherein the solar power source is capable of dispensing at least about 5 volts of power, 10 volts of power, 15 volts of power, 20 volts of power, 25 volts of power, 30 volts of power, 35 volts of power, 40 volts of power, or 45 volts of power. E15. The portable winch system of any one of embodiments E1-E14, wherein the system can be reversibly attached to a substantially rigid object. E16. The portable winch system of embodiment E15, wherein the substantially rigid object is a vehicle, trailer, tree, or rock. E17. The portable winch system of any one of embodiments E1-E16, further comprising a mechanism for mounting the system to a hitch receiver of a vehicle. E18. The portable winch system of embodiment E17, wherein the mechanism for mounting the system to a hitch receiver is reversibly coupled to the frame and/or the housing. E19. The portable winch system of any one of embodiments E1-E18, wherein a mechanism for rolling the system is mounted to the frame and/or the housing. E20. The portable winch system of embodiment E19, wherein the mechanism for rolling the system comprises one or more casters. E21. The portable winch system of any one of embodiments E1-E20, wherein a mechanism for carrying the system is attached to the frame and/or the housing. E22. The portable winch system of embodiment E21, wherein the mechanism for carrying the system comprises one or more carrying handles. E23. The portable winch system of any one of embodiments E1-E22, further comprising one or more controls operably connected to the winch for directing operation of the winch. E24. The portable winch system of embodiment E23, wherein the one or more controls are operably connected to the winch via a wired or wireless connection. E25. The portable winch system of embodiment E23 or embodiment E24, wherein the one or more controls are disposed on the frame and/or the housing. 26. The portable winch system of any one of embodiments E23-E25, wherein the one or more controls are substantially enclosed by the housing. E27. The portable winch system of any one of embodiments E1-E26, wherein the winch has a power rating of at least about 500 lbs, at least about 1,000 lbs, at least about 1,500 lbs, at least about 2,000 lbs, at least about 2,500 lbs, at least about 3,000 lbs, at least about 3,500 lbs, at least about 4,000 lbs, at least about 4,500 lbs, or at least about 5,000 lbs. E28. The portable winch system of any one of embodiments E1-E27, wherein the system weighs less than about 15 lbs, less than about 20 lbs, less than about 25 lbs, less than about 30 lbs, less than about 35 lbs, less than about 40 lbs, less than about 45 lbs, less than about 50 lbs, less than about 55 lbs, less than about 60 lbs, less than about 65 lbs, less than about 70 lbs, less than about 75 lbs, or less than about 80 lbs. E29. The portable winch system of any one of embodiments E1-E28, wherein the system further comprises one or more light fixtures. E30. The portable winch system of embodiment E29, wherein the light fixture comprises LED, fluorescent, halogen, and/or incandescent lights. E31. The portable winch system of any one of embodiments E1-E30, wherein the dimensions of the frame and/or housing of the system are between about 5 and about 25 inches tall, about 10 and about 25 inches wide, and about 5 and about 25 inches in depth.

DETAILED DESCRIPTION OF THE INVENTION

Figure 1:
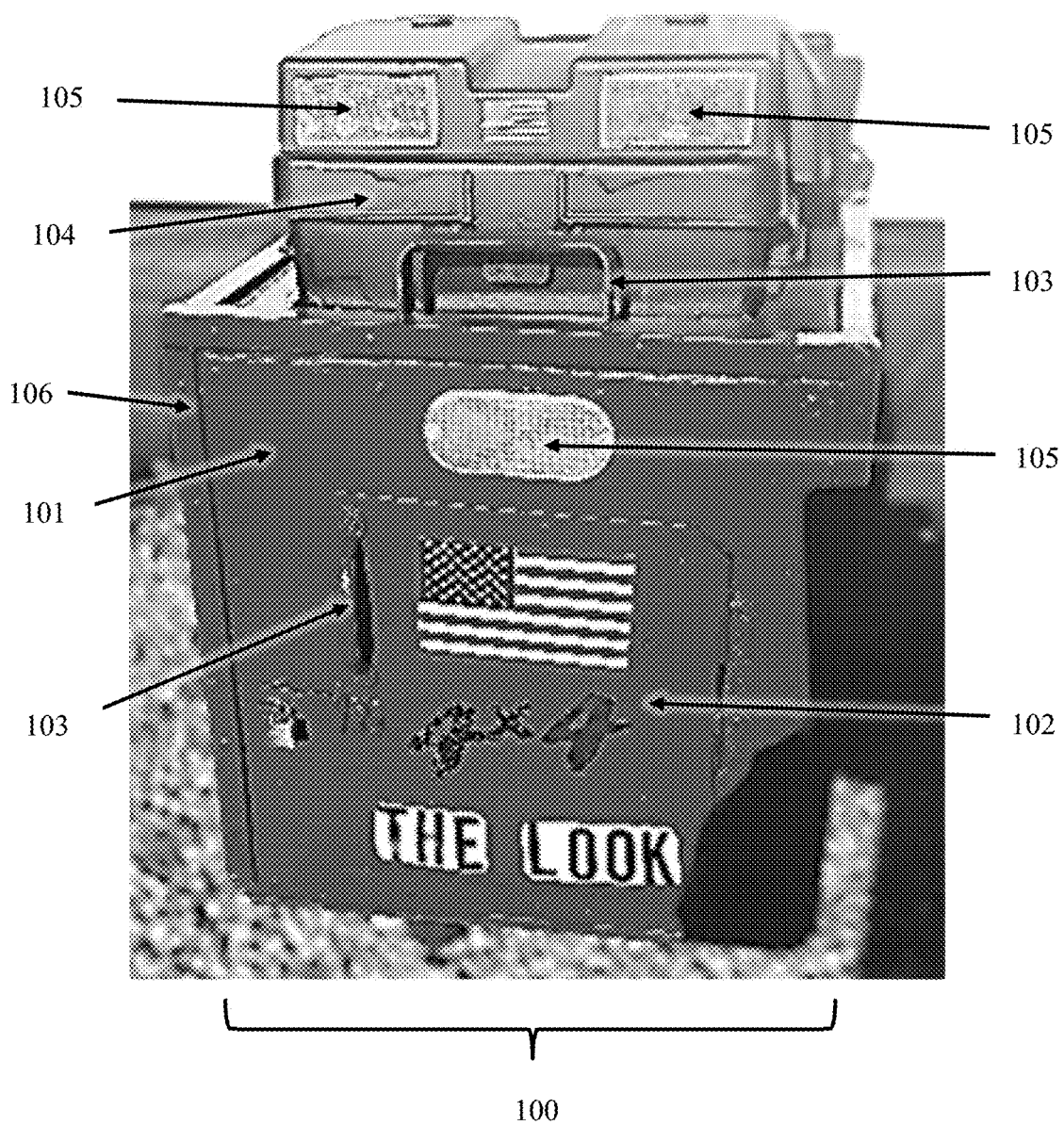
FIG. 1 is a front view of the exterior of an exemplary embodiment of a portable winch system of the invention described herein in which a frame of the portable winch system comprises a housing, according to various embodiments described herein.

Exemplary embodiments of a portable winch system that is powered by a rechargeable first power source and comprises a second power source may be further understood with reference to the drawings and the following description, wherein like elements in the drawings are referred to with the same reference numerals.

FIG. 1 is a front view of the exterior of an exemplary embodiment of a portable winch system 100 comprising a frame 106 and a housing 101, according to various embodiments described herein. In certain embodiments, the portable winch system 100 comprises a frame 106 that supports the various components of the portable winch system 100, including a winch 200 (see, e.g., FIG. 2), a rechargeable first power source 600 (see, e.g., FIG. 6), and a second power source 400 (see, e.g., FIG. 4) that is capable of at least partially recharging the rechargeable first power source 600.

In certain embodiments, the portable winch system 100 further comprises a housing 101 that further supports the various components of the portable winch system 100, including a winch 200, a rechargeable first power source 600, and a second power source 400 that is capable of at least partially recharging the rechargeable first power source 600. In some embodiments, the housing 101 substantially encloses one or more components of the portable winch system 100, for example, the winch 200. The housing may comprise an opening 204 that allows the user to access the winch 200 and/or other components inside the area substantially enclosed by the housing 101. In certain embodiments, the opening 204 may comprise a hinged door 102.

In some embodiments, the frame 106 may be substantially rectangular in shape. In certain embodiments, the housing 101 may be substantially cuboidal in shape. The dimensions of the frame 106 and/or housing 101 may be adjusted to accommodate the size of the components of the portable winch system 100. In some embodiments, the frame 106 and/or housing 101 may be between about 5 and about 25 inches tall, about 10 and about 25 inches wide, and about 5 and about 25 inches in depth. In certain embodiments, the frame 106 and/or housing 101 may be about 15 inches tall, about 16 inches wide, and about 16 inches in depth.

In some embodiments, one or more of the components of the portable winch system 100, including a winch 200, a rechargeable first power source 600, and a second power source 400 that is capable of at least partially recharging the rechargeable first power source 600, may be mounted to the frame 106 and/or housing 101, and in certain embodiments may be reversibly mounted to the frame 106 and/or housing 101, by various means known in the art, including being bolted, nailed, glued, tied, welded, or otherwise attached to the frame 106 and/or housing 101.

The frame 106 and/or housing 101 may be constructed from any type of material that is sufficiently rigid to support the various components of the portable winch system 100 or a combination of materials. Exemplary materials include metal, plastic, wood, or any other sufficiently rigid and sturdy materials known to those in the art, and any combination thereof. In certain embodiments, the frame 106 and the housing 101 are comprised of metal.

The frame 106 and/or housing 101 may also comprise a mechanism for lifting and/or transporting the portable winch system 100. In certain embodiments, the mechanism comprises one or more handles 103. In some embodiments, a handle 103 is attached to the housing 101 on the upper portion of the winch system 100. The handle 103 allows the user to easily grab and lift or pull the winch system 100. Also, in certain embodiments, the door 102 of the housing 101 includes a handle 103 that allows the user to pull open the hinged door 102.

In certain embodiments, the portable winch system 100 may also comprise additional housings that substantially enclose one or more of the components of the portable winch system 100. In some embodiments, a rechargeable first power source 600 is substantially enclosed in a battery housing 104.

In some embodiments, the portable winch system 100 of the invention further comprises one or more light reflectors 105. In certain embodiments, light reflectors 105 are attached to the housing 101 of the winch system 100 and/or additional separate housings such as the battery housing 104.

Figure 2:
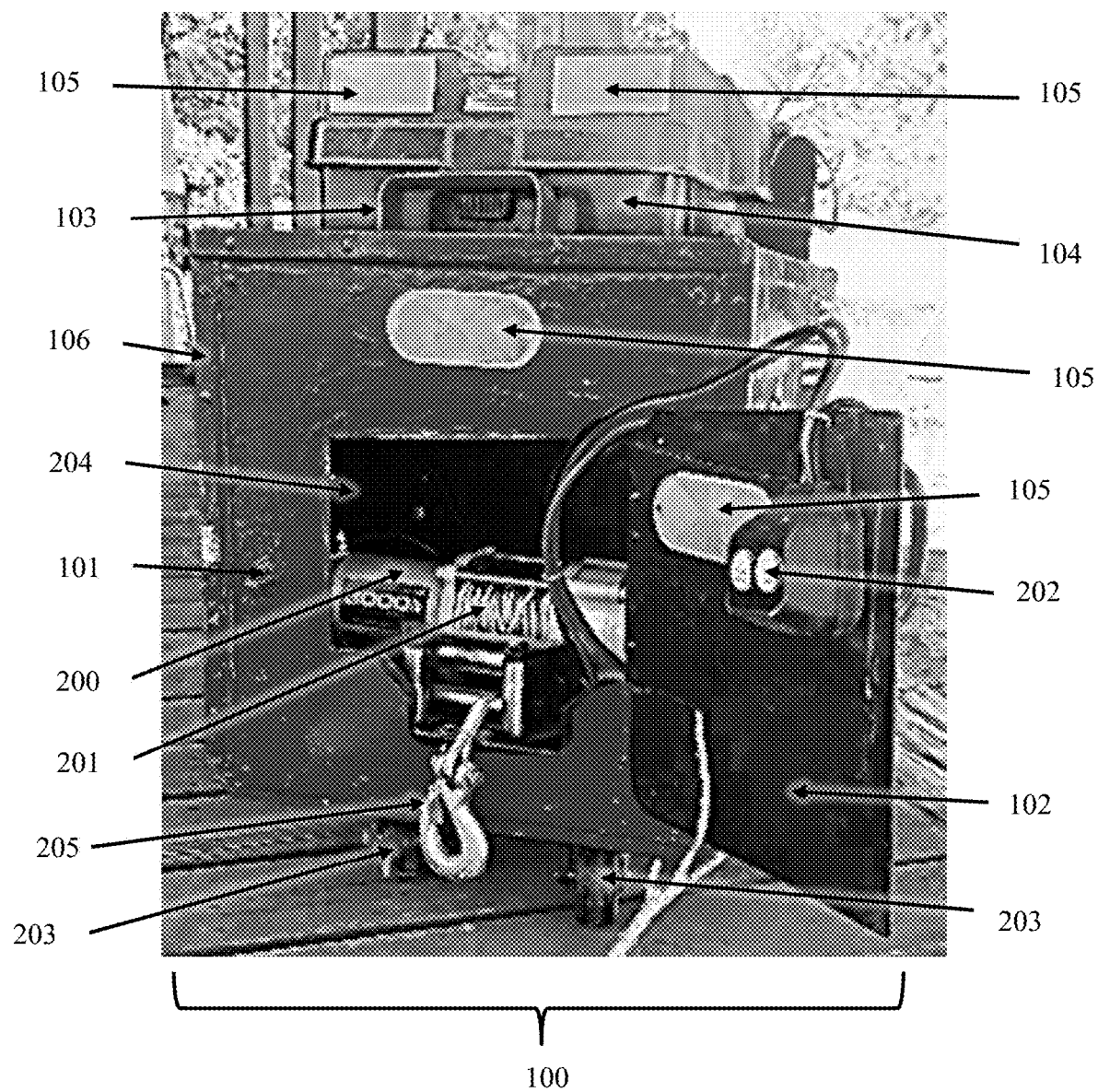
FIG. 2 is a front view of the exterior and interior of an exemplary embodiment of a portable winch system of the invention described herein in which a frame of the portable winch system comprises a housing, according to various embodiments described herein.

FIG. 2 is a front view of the interior of an exemplary embodiment of a portable winch system 100 comprising a frame 106 and a housing 101, according to various embodiments described herein. In some embodiments, the interior 204 of the portable winch system 100, an area substantially enclosed by a housing 101 of the winch system 100, may be accessed by opening a hinged door 102. In certain embodiments, the housing 101 substantially encompasses one or more components of the portable winch system 100, for example, the winch 200. In some embodiments, the winch 200 comprises a rotating drum or reel, a rope, cable, or chain wound around the drum or reel, and a motor operably attached to the drum or reel for extending and retracting the rope, cable, or chain. In certain embodiments, the winch 200 comprises a cable 201. In some embodiments, the rope, cable, or chain comprises a hook 205 or other mechanism for reversibly attaching the rope, cable, or chain to an object, to the portable winch system 100, or back on the rope, cable, or chain. In certain embodiments, the winch 200 is disposed on or attached to the housing 101 in the interior 204 of the portable winch system 100, i.e., the portion substantially enclosed by the housing 101. The portable winch system 100 may accommodate any known winch apparatus that is capable of pulling, hauling, towing, or lifting heavy objects, such as vehicles, trailers, debris, and other heavy objects. In certain embodiments, the winch 200 has a power rating of at least about 500 lbs, about 1,000 lbs, about 1500 lbs, about 2,000 lbs, about 2500 lbs, about 3000 lbs, about 3500 lbs, about 4,000 lbs, about 4,500 lbs, or about 5,000 lbs.

In some embodiments, the portable winch system 100 comprises controls 202 operably connected to the winch 200 for directing operation of the winch 200. In certain embodiments, the controls 202 may have a wired or wireless connection to the portable winch system 100. The controls 202 may be bolted, nailed, glued, tied, or otherwise attached, including reversibly attached, to the frame 106 and/or the housing 101. In certain embodiments, the controls 202 may be substantially enclosed by the housing 101. In some embodiments, the controls 202 comprise an on and off switch or one or more buttons to operate the winch 200 and/or other accessory items included as part of the winch system 100. In certain embodiments, the controls 202 comprising on and off buttons is attached to a hinged door 102 of the portable winch system 100.

In some embodiments, the frame 106 and/or housing 101 of the portable winch system 100 comprises a mechanism for moving the portable winch system 100. In certain embodiments, the mechanism for moving the portable winch system 100 comprises one or more casters 203. In some embodiments, the one or more casters 203 is mounted to the bottom of the housing 101. In certain embodiments, the mechanism for moving the portable winch system 100 allows the portable winch system 100 to roll on a surface, such as the ground, so that the portable winch system 100 is easily transportable. In some embodiments, the portable winch system 100 may weigh less than about 15 lbs, less than about 20 lbs, less than about 25 lbs, less than about lbs, less than about 35 lbs, less than about 40 lbs, less than about 45 lbs, less than about 50 lbs, less than about 55 lbs, less than about 60 lbs, less than about 65 lbs, less than about 70 lbs, less than about 75 lbs, less than about 80 lbs, less than about 90 lbs, less than about 100 lbs, less than about 110 lbs, less than about 120 lbs, less than about 130 lbs, less than about 140 lbs, or less than about 150 lbs.

Figure 3:
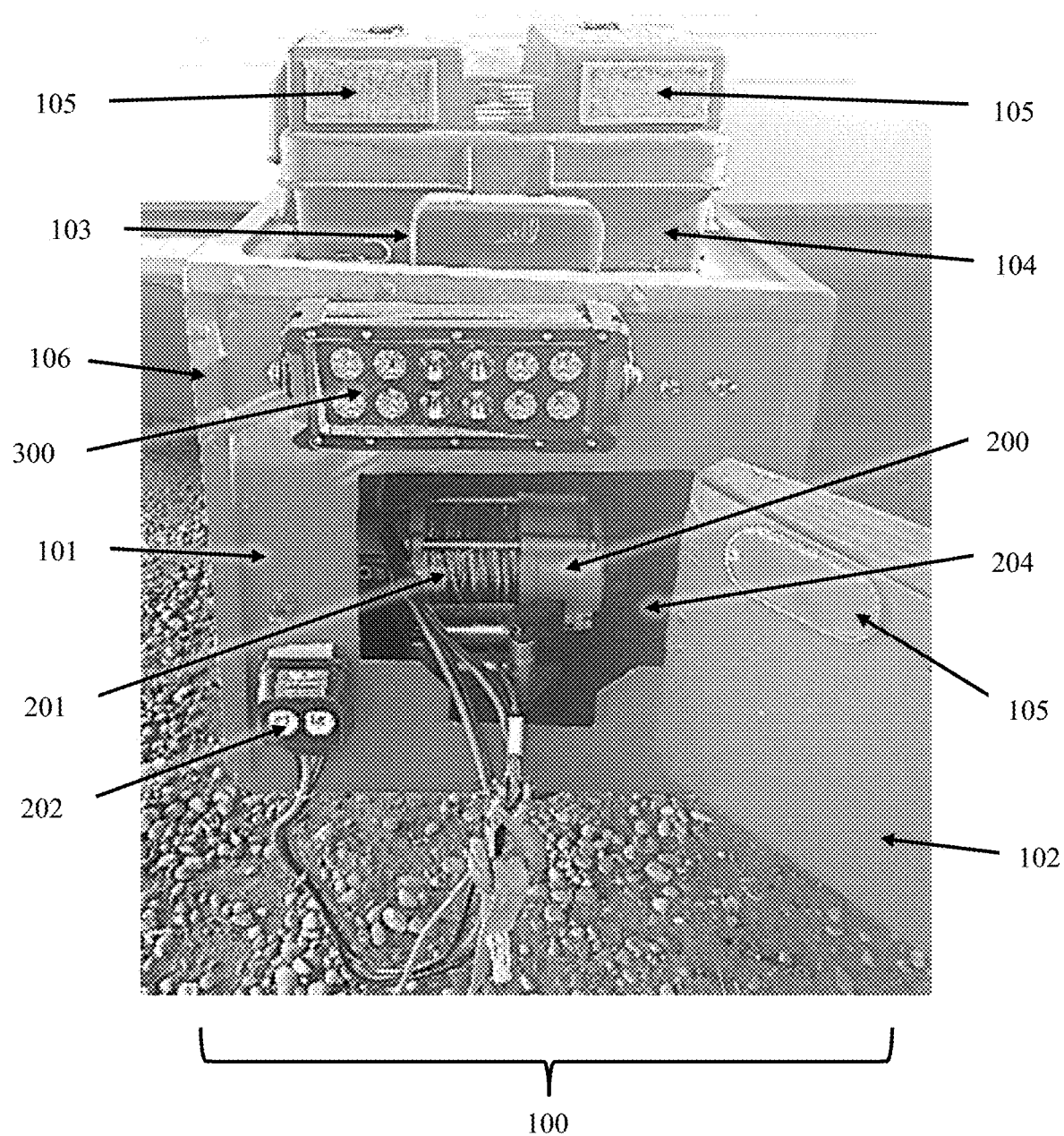
FIG. 3 is a front view of the exterior and interior of an exemplary embodiment of a portable winch system of the invention described herein in which a frame of the portable winch system comprises a housing, according to various embodiments described herein.

FIG. 3 is a front view of the exterior and interior of an exemplary embodiment of a portable winch system 100 of the invention comprising a frame 106 and a housing 101, according to various embodiments described herein. In some embodiments, the portable winch system 100 comprises one or more light fixtures 300 disposed on the frame 106 and/or housing 101. In certain embodiments, the one or more light fixtures 300 may be LED, fluorescent, halogen, and/or incandescent lights. In some embodiments, the one or more light fixtures 300 may be bolted, nailed, glued, tied, or otherwise, including reversibly, attached to the frame 106 and/or housing 101. In some embodiments, the one or more light fixtures is an LED light fixture 300 that is attached to the front of the housing 101.

Figure 4:
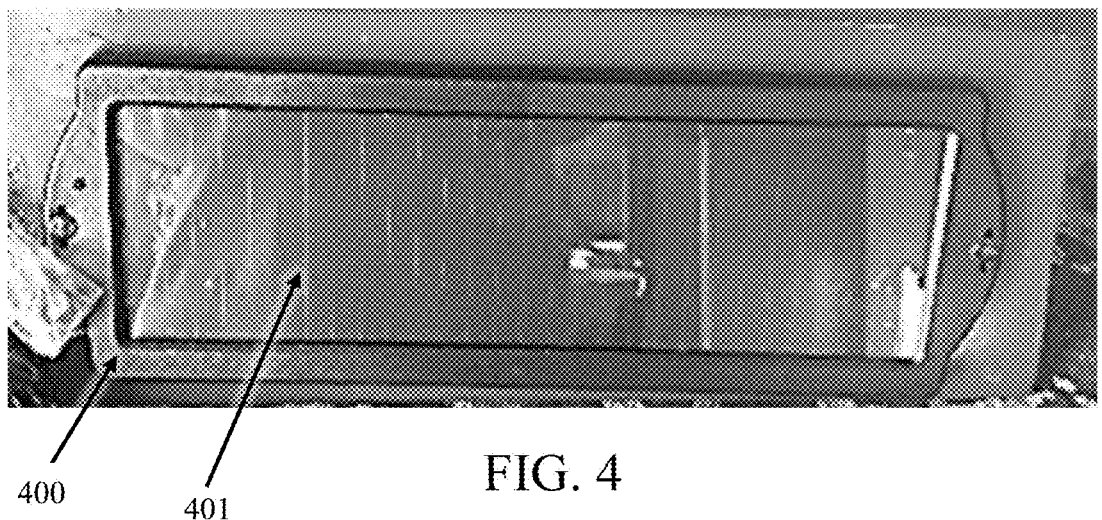
FIG. 4 shows an exemplary embodiment of a second power source of a portable winch system of the invention described herein, according to various embodiments described herein.

FIG. 4 shows an exemplary embodiment of a second power source 400 of a portable winch system 100 of the invention, according to various embodiments described herein. In certain embodiments, the second power source 400 is capable of at least partially recharging a rechargeable first power source 600 of the portable winch system 100. In some embodiments, the second power source 400 is a solar power source comprising one or more solar panels 401. In some embodiments, the second power source 400 is also capable of dispensing at least about 5 volts of power, at least about 10 volts of power, at least about 15 volts of power, at least about 20 volts of power, at least about 25 volts of power, at least about 30 volts of power, at least about 35 volts of power, at least about 40 volts of power, at least about 45 volts of power, or at least about volts of power. In certain embodiments, the second power source 400 is capable of dispensing at least about 48 volts of power.

Figure 5:
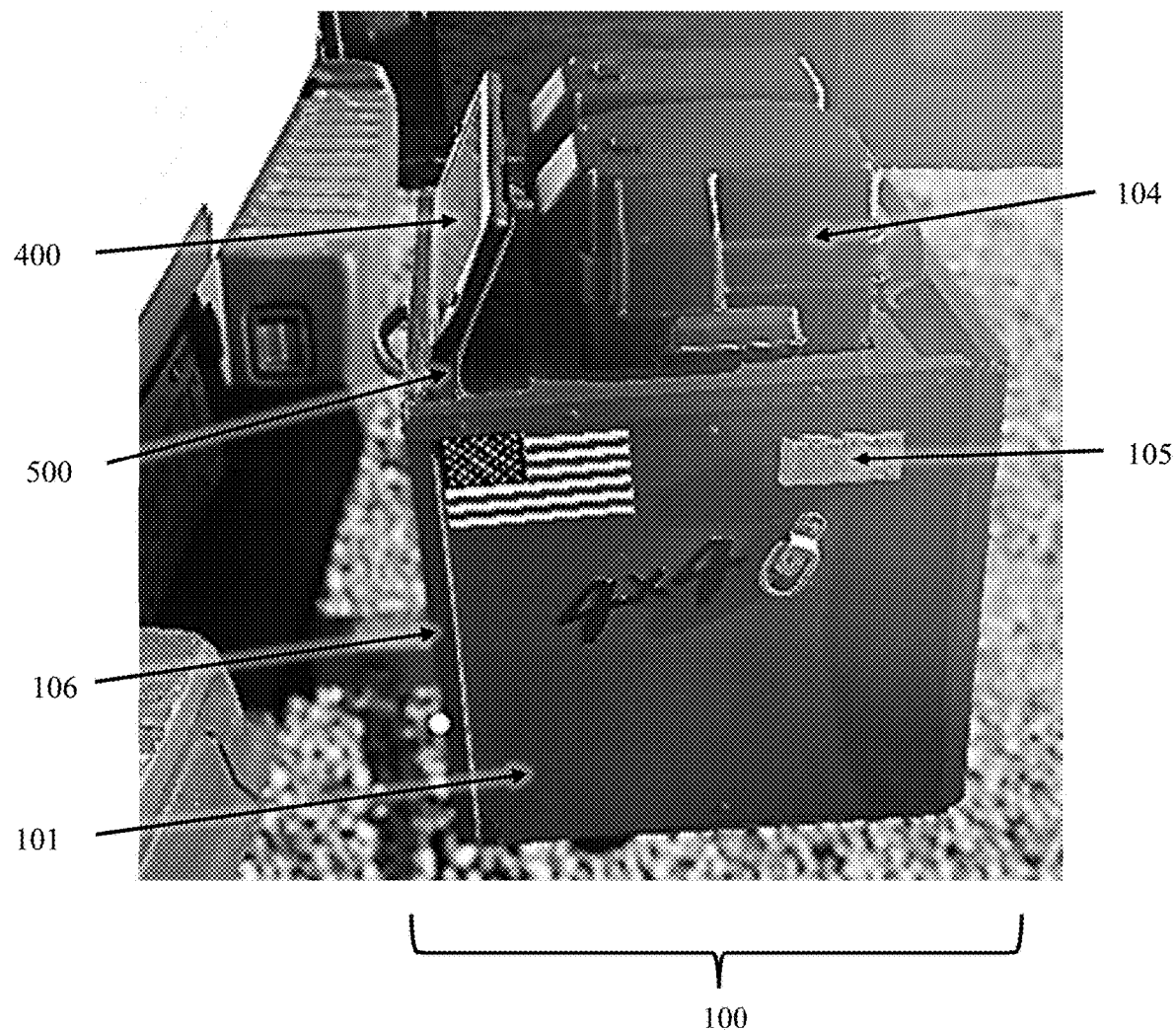
FIG. 5 is a side view of an exemplary embodiment of a portable winch system of the invention described herein in which a frame of the portable winch system comprises a housing, according to various embodiments described herein.

FIG. 5 is a side view of an exemplary embodiment of a portable winch system 100 of the invention comprising a frame 106 and a housing 101, according to various embodiments described herein. In some embodiments, the portable winch system 100 comprises a second power source 400 that is attached to the top of the housing 101 of the portable winch system. The second power source 400 may be bolted, nailed, glued, tied, or otherwise, including reversibly, attached to the frame 106 and/or housing 101 of the portable winch system 100. In certain embodiments, the second power source 400 is tilted at an angle relative to the housing 101 and/or frame 106 to which it is attached. In some embodiments, the second power source 400 is mounted flush or substantially flush to the housing 101 and/or frame 106 to which it is attached. In certain embodiments in which the second power source 400 comprises a solar power source, the orientation of the second power source 400 (e.g., at an angle or flush mounted) in relation to the housing 101 and/or frame 106 to which it is attached allows for the second power source 400 to capture adequate solar energy. In some embodiments, the top of the frame 106 and/or housing 101 of the portable winch system 100 comprises a platform 500 or other known mounting device or mechanism to allow for the second power source 400 to be attached to the housing 101 and/or frame 106 at a desirable orientation (e.g., angle or parallel) to the housing 101 and/or frame 106. In certain embodiments, the second power source 400 may be bolted, nailed, glued, tied, or otherwise, including reversibly, attached to the platform 500.

Figure 6:
FIG. 6 is a top view of an exemplary embodiment of a portable winch system of the invention described herein in which a frame of the portable winch system comprises a housing, according to various embodiments described herein.

FIG. 6 is a top view of an exemplary embodiment of a portable winch system 100 of the invention comprising a frame 106 and a housing 101, according to various embodiments described herein. In certain embodiments, the portable winch system comprises a rechargeable first power source 600. In some embodiments, the rechargeable first power source 600 is a battery. In certain embodiments, the rechargeable first power source 600 is a 12-volt battery, a lithium-ion battery, a lead acid battery, and/or an AGM battery.

Figure 7:
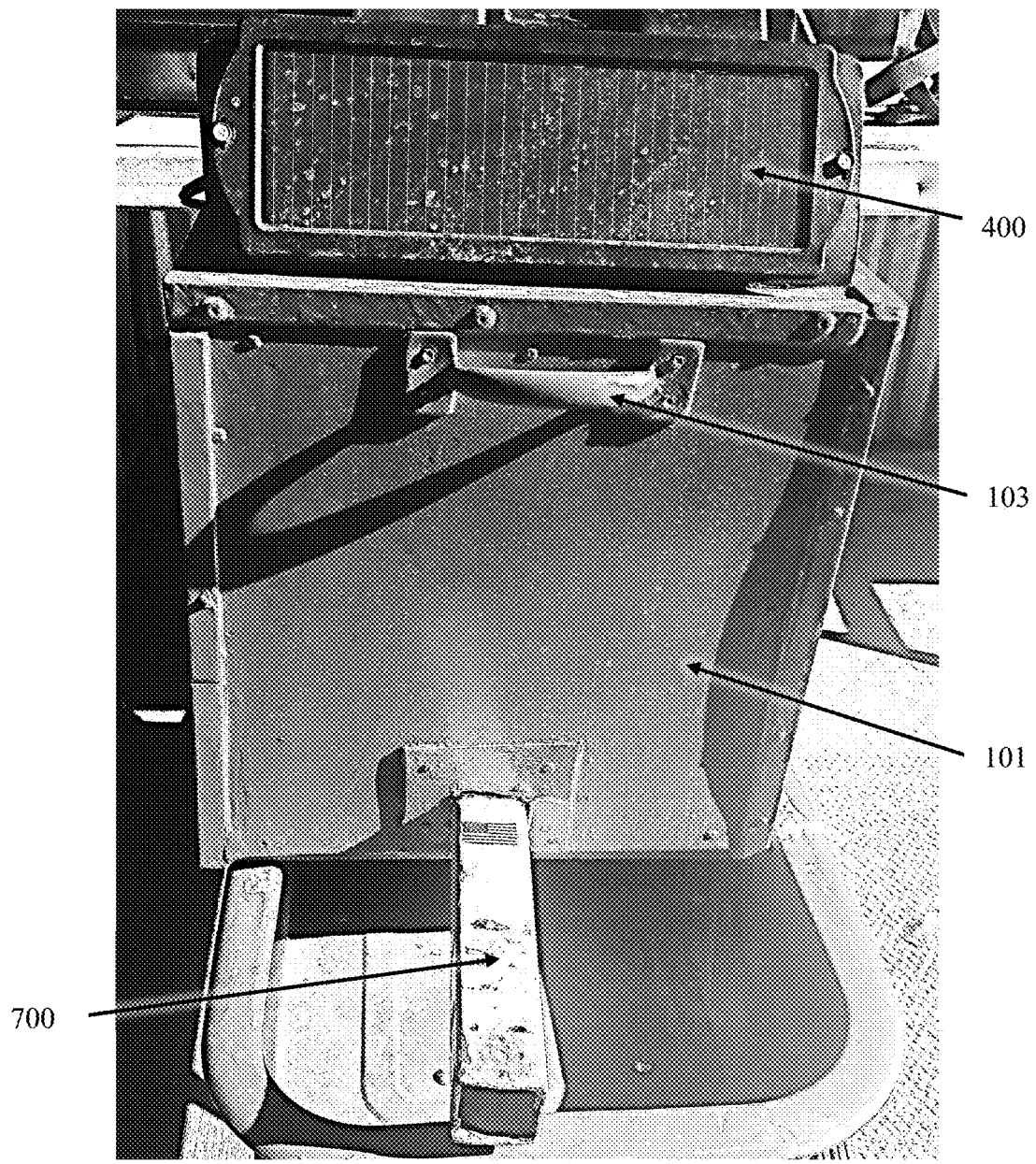
FIG. 7 is a back view of an exemplary embodiment of a portable winch system of the invention described herein in which a frame of the portable winch system comprises a housing and a hitch mount configured for mounting to a hitch receiver, according to various embodiments described herein.

FIG. 7 is a back view of an exemplary embodiment of a portable winch system 100 of the invention comprising a frame 106 and a housing 101, according to various embodiments described herein. In some embodiments, the portable winch system 100 may be reversibly attached to a substantially rigid object such as a vehicle, trailer, tree, or rock. In some embodiments, the portable winch system 100 is configured to attach, including reversibly, to the hitch receiver of a vehicle or trailer. In certain embodiments, the portable hitch system 100 comprises a hitch mount 700, that is configured for mounting the portable winch system 100 to a hitch receiver. In some embodiments, the hitch receiver is located on a vehicle or trailer. In certain embodiments, the hitch mount 700 may be reversibly coupled to the frame and/or housing 101 of the winch system 100.

What is claimed is:

1. A portable winch system, comprising:
   a frame;
   a winch having a power rating of at least about 500 lbs;
   a rechargeable first power source operably connected to the winch; and
   a second power source operably connected to the rechargeable first power source, the winch, or both the rechargeable first power source and the winch;
   wherein one or more of the winch, the rechargeable first power source, and the second power source is mounted to the frame, and
   wherein the second power source comprises a solar power source that is capable of at least partially charging the rechargeable first power source.

2. The portable winch system of claim 1, wherein one or more of the winch, the rechargeable first power source, and the second power source is reversibly mounted to the frame.

3. The portable winch system of claim 1, further comprising a housing, wherein the housing substantially encloses one or more of the winch, the rechargeable first power source, and the second power source.

4. The portable winch system of claim 3, wherein one or more of the winch, the rechargeable first power source, and the second power source is mounted to the housing.

5. The portable winch system of claim 3, wherein one or more of the winch, the rechargeable first power source, and the second power source is reversibly mounted to the housing.

6. The portable winch system of claim 3, wherein the frame and/or housing comprises metal, plastic, wood, or a combination thereof.

7. The portable winch system of claim 1, wherein the rechargeable first power source comprises a battery.

8. The portable winch system of claim 7, wherein the battery is a 12-volt battery, a lithium-ion battery, a lead acid battery, and/or an AGM battery.

9. The portable winch system of claim 1, wherein the solar power source is capable of dispensing up to about 48 volts of power.

10. The portable winch system of claim 9, wherein the solar power source is capable of dispensing at least about 5 volts of power, 10 volts of power, 15 volts of power, 20 volts of power, 25 volts of power, 30 volts of power, 35 volts of power, 40 volts of power, or 45 volts of power.

11. The portable winch system of claim 1, wherein the system can be reversibly attached to a substantially rigid object.

12. The portable winch system of claim 11, wherein the substantially rigid object is a vehicle, trailer, tree, or rock.

13. The portable winch system of claim 1, further comprising a mechanism for mounting the system to a hitch receiver.

14. The portable winch system of claim 1, further comprising a mechanism for rolling the system, wherein the mechanism for rolling the system comprises one or more casters.

15. The portable winch system of claim 1, further comprising one or more controls operably connected to the winch for directing operation of the winch.

16. The portable winch system of claim 15, wherein the one or more controls are operably connected to the winch via a wired or wireless connection.

17. The portable winch system of claim 1, wherein the winch has a power rating of at least about 1,000 lbs, at least about 1,500 lbs, at least about 2,000 lbs, at least about 2,500 lbs, at least about 3,000 lbs, at least about 3,500 lbs, at least about 4,000 lbs, at least about 4,500 lbs, or at least about 5,000 lbs.

18. The portable winch system of claim 1, wherein the system weighs less than about 15 lbs, less than about 20 lbs, less than about 25 lbs, less than about 30 lbs, less than about 35 lbs, less than about 40 lbs, less than about 45 lbs, less than about 50 lbs, less than about 55 lbs, less than about 60 lbs, less than about 65 lbs, less than about 70 lbs, less than about 75 lbs, or less than about 80 lbs.

19. The portable winch system of claim 1, wherein the system further comprises one or more light fixtures.

* * * * *